United States Patent [19]

Kitamoto

[11] Patent Number: 5,074,120
[45] Date of Patent: Dec. 24, 1991

[54] MULTI-TYPE AIR-CONDITIONING SYSTEM WITH FAST HOT STARTING FOR HEATING OPERATION

[75] Inventor: Manabu Kitamoto, Shizuoka, Japan

[73] Assignee: Kabushiki Kaisha Toshiba, Kawasaki, Japan

[21] Appl. No.: 533,408

[22] Filed: Jun. 5, 1990

[30] Foreign Application Priority Data

Jun. 5, 1989 [JP] Japan .................. 1-142766

[51] Int. Cl.$^5$ .................. F25D 21/06; F25B 1/00
[52] U.S. Cl. .................. 62/156; 62/228.4
[58] Field of Search .................. 62/228.4, 215, 180, 62/156, 158; 237/2 B

[56] References Cited

U.S. PATENT DOCUMENTS 4,622,827 11/1986 Jabami et al. .................. 62/158
4,720,982 1/1988 Shimizu et al. .................. 62/228.4

FOREIGN PATENT DOCUMENTS 0071840 4/1985 Japan .................. 62/228.4
61-205743 9/1986 Japan .
1-70657 3/1989 Japan .

Primary Examiner—William E. Wayner
Attorney, Agent, or Firm—Cushman, Darby & Cushman

[57] ABSTRACT

An outdoor unit includes at least a variable-capacity compressor and an outdoor heat exchanger coupled thereto. Each of a plurality of indoor units includes at least an indoor heat exchanger and a section for outputting required capacity data. A distribution unit parallel-couples the plurality of indoor units to the outdoor unit so as to constitute a plurality of refrigeration cycles for at least heating operations. The distribution unit includes a plurality of refrigerant flow control valves for the respective refrigeration cycles. A first control section provides flow rate control commands to the refrigerant flow rate control valves, in accordance with the required capacity data, and controls an operating frequency to change a capacity of the variable-capacity compressor in accordance with sum data of the required capacity data. A second control section performs a frequency increasing control to increase the operating frequency of the variable-capacity compressor to a predetermined value higher than a value corresponding to the required capacity data when the heating operation is started. A third control section cancels the frequency increasing control of the second control section at a predetermined period of time elapse after the second control section causes the refrigeration cycles to start heating operations.

12 Claims, 6 Drawing Sheets

MULTI-TYPE AIR-CONDITIONING SYSTEM WITH FAST HOT STARTING FOR HEATING OPERATION

BACKGROUND OF THE INVENTION

1. Field of the Invention

The present invention relates to a multi-type air-conditioning system with a fast hot starting for a heating operation and, more particularly, to an air-conditioning system with a fast hot starting for a heating operation, which is constituted by heat pump type refrigeration cycles including an outdoor unit having at least one variable-capacity compressor, and a plurality of indoor units.

2. Description of the Related Art

In a multi-type air-conditioning system of the above-mentioned type, one or two variable-capacity compressors in an outdoor unit are driven at a predetermined operating frequency in accordance with a required capacity of each indoor unit. With this operation, a required amount of a refrigerant is supplied from the outdoor unit to each indoor unit through a refrigerant flow control valve, and desired air conditioning in each room is attained.

FIG. 9 shows a conventional multi-type air-conditioning system of this type.

Reference symbol A denotes an outdoor unit including one or two variable-capacity compressors. A branch unit B is connected to the outdoor unit A. A plurality of indoor units C1, C2, and C3 are connected to the branch unit B through a plurality of refrigerant flow control valves incorporated in the branch unit B.

More specifically, the indoor units C1, C2, and C3 respectively send required capacities corresponding to the respective air-conditioning loads to the branch unit B as frequency setting signals f1, f2, and f3.

The branch unit B obtains the required capacities of the respective indoor units from the frequency setting signals f1, f2, and f3, and sends a frequency setting signal f0 corresponding to the sum of the required capacities to the outdoor unit A.

The outdoor unit A controls the operating frequencies of the compressors in accordance with the frequency setting signal f0, and supplies a refrigerant from the compressors, as a required amount of a refrigerant, to the respective indoor units C1, C2, and C3 through the refrigerant flow control valves in the branch unit B.

Assume that a heating operation is started by using an indoor unit having the minimum capacity of such a conventional multi-type air-conditioning system in a very cold room early in the morning in a winter season in which heating operations are required. In such a case, since the capacity of the indoor unit is smaller than that of the outdoor unit, the operating frequency of the compressor cannot be sufficiently increased by only a required capacity command from the indoor unit. Therefore, it is difficult to sufficiently heat piping normally having a length of 10 meters or more or an indoor heat exchanger within a short period of time.

In addition, the indoor unit includes a function for preventing cool air from being blown by inhibiting an air blowing operation until the temperature of the indoor heat exchanger reaches a predetermined value. For this reason, warm air is not blown (hot starting is not performed) into the room for a considerably long period of time, i.e., hot starting in a heating operation is very slow.

Such an inconvenience occurs when a heating operation is resumed upon a defrosting operation as well as when a heating operations is started.

SUMMARY OF THE INVENTION

It is, therefore an object of the present invention to provide a new and improved multi-type air-conditioning system with a fast hot starting for a heating operation which can blow warm air into rooms within a short period of time at least when a heating operation is started, and can greatly improve hot starting characteristics.

It is another object of the present invention to provide a multi-type air-conditioning system which can blow warm air into rooms within a short period of time at least when a heating operation is started or resumed, can greatly improve hot starting characteristics, and allows a stable operation under an overload condition.

According to one aspect of the present invention, there is provided a multi-type air-conditioning system comprising:

an outdoor unit including at least a variable-capacity compressor and an outdoor heat exchanger coupled thereto;

a plurality of indoor units each including at least an indoor heat exchanger and means for outputting required capacity data in accordance with an air-conditioning load, for at least a heating operation, of the indoor heat exchanger;

a distribution unit for parallel-coupling the plurality of indoor units to the outdoor unit so as to constitute a plurality of refrigeration cycles for at least heating operations, the distribution unit including a plurality of refrigerant flow rate control means for the respective refrigeration cycles;

first control means for supplying flow rate control commands to the refrigerant flow rate control means of the distribution unit, respectively, in accordance with the required capacity data from the plurality of indoor units, and for controlling an operating frequency to change a capacity of the variable-capacity compressor in accordance with sum data of the required capacity data;

second control means for performing a frequency increasing control to increase the operating frequency of the variable-capacity compressor to a predetermined value higher than a value corresponding to the required capacity data when the heating operation is started; and third control means for canceling the frequency increasing control of the second control means at a predetermined period of time elapse after the second control means causes the refrigeration cycles to start heating operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above

DETAILED DESCRIPTION OF THE PREFERRED EMBODIMENTS

Figure 1:
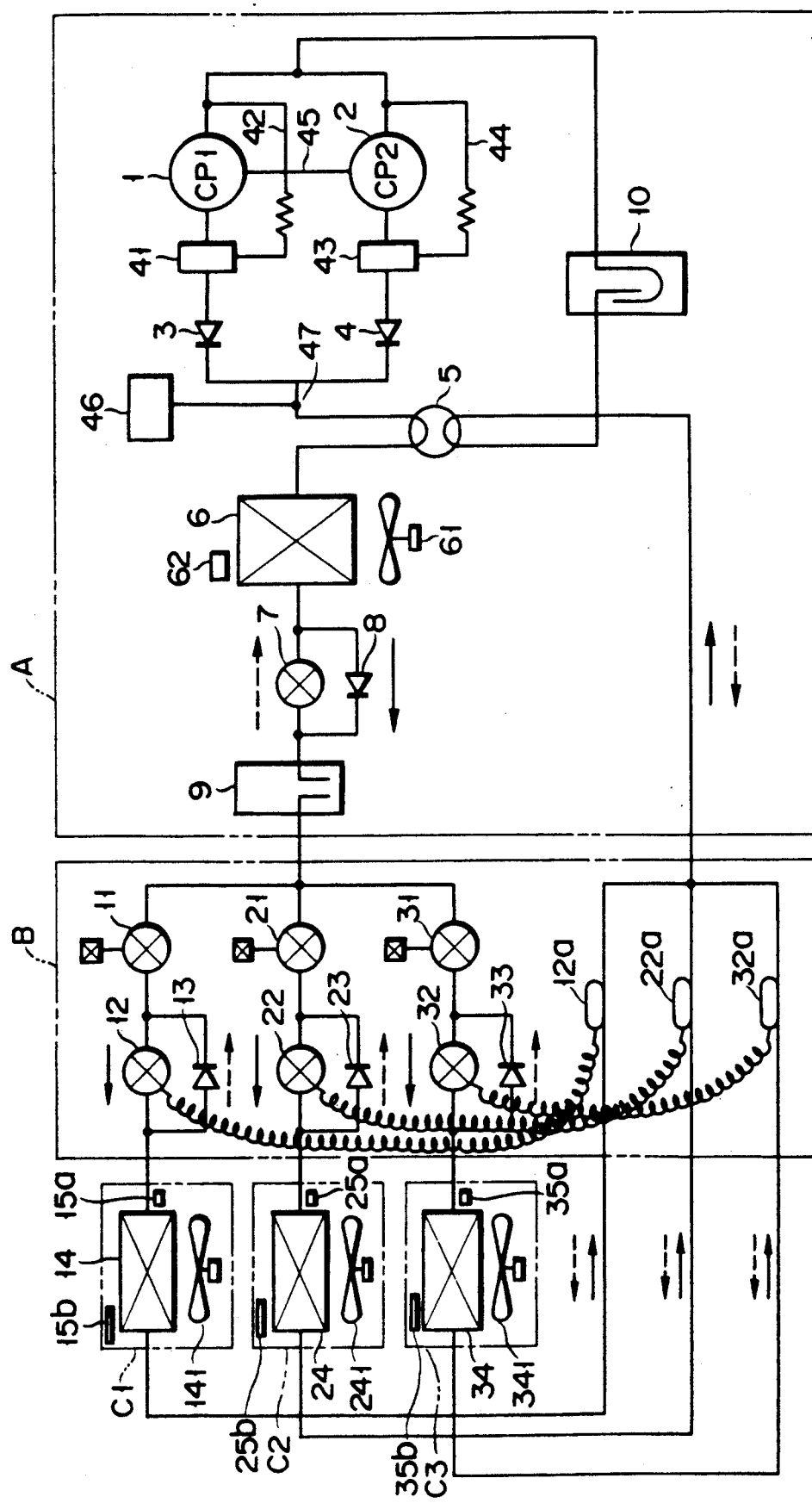
FIG. 1 is a view showing an arrangement of a refrigeration cycle system to which the first embodiment of the present invention is applied.

Reference will now be made in detail to the presently preferred embodiments of the invention as illustrated in the accompanying drawings, in which like reference characters designate like or corresponding parts throughout the several drawings.

FIG. 1 shows a refrigeration cycle system applied as the first embodiment of the present invention. An outdoor unit A includes two variable-capacity compressors 1 and 2. These compressors 1 and 2 are connected in parallel with each other through check valves 3 and 4.

The compressors 1 and 2, a 4-way valve 5, an outdoor heat exchanger 6, a parallel combination of a heating expansion valve 7 and a cooling cycle forming check valve 8, and a liquid tank 9 of the outdoor unit A sequentially communicate with electric flow control valves 11, 21, and 31, and parallel combinations of cooling expansion values 12, 22, and 32 and heating cycle forming check valves 13, 23, and 33 of the branch unit B. In addition, this structure communicates with an accumulator 10 of the outdoor unit A through indoor heat exchangers 14, 24, and 34 of a plurality of indoor units C1, C2, and C3, thus constituting a heat pump type refrigeration cycle system.

The cooling expansion valves 12, 22, and 32 respectively include heat-sensitive cylinders 12a, 22a, and 32a. These heat-sensitive cylinders 12a, 22a, and 32a are respectively attached to gas-side refrigerant pipes of the indoor heat exchangers 14, 24, and 34.

That is, the indoor heat exchangers 14, 24, and 34 are arranged in parallel.

When a cooling operation is to be performed, a refrigerant is flowed in directions indicated by solid arrows in FIG. 1 to form a cooling cycle. When a heating operation is to be performed, the refrigerant is flowed in directions indicated by broken arrows in FIG. 1 upon switching operation of the 4-way valve 5 so as to constitute a heating cycle.

An oil separator 41 is arranged in a pipe on the refrigerant discharge side of the compressor 1, and an oil bypass pipe 42 is arranged between the oil separator 41 and a pipe on the refrigerant suction side of the compressor 1. In addition, an oil separator 43 is arranged in a pipe on the refrigerant discharge side of the compressor 2, and an oil bypass pipe 44 is arranged between the oil separator 43 and a pipe on the refrigerant suction side of the compressor 2. An oil equalizing pipe 45 causes the casings of the compressors 1 and 2 to communicate with each other at their reference oil surface levels, and allows circulation of a lubricant oil.

A pressure sensor 46 is mounted on a high-pressure side refrigerant pipe 47 of the refrigeration cycle. An outdoor heat exchanger temperature sensor 62 and an outdoor fan 61 are arranged near the outdoor heat exchanger 6.

Indoor heat exchanger temperature sensors 15a, 25a, and 35a and defrosting heaters 15b, 25b, and 35b are respectively arranged near the indoor heat exchangers 14, 24, and 34, together with indoor fans 141, 241, and 341.

Figure 2:
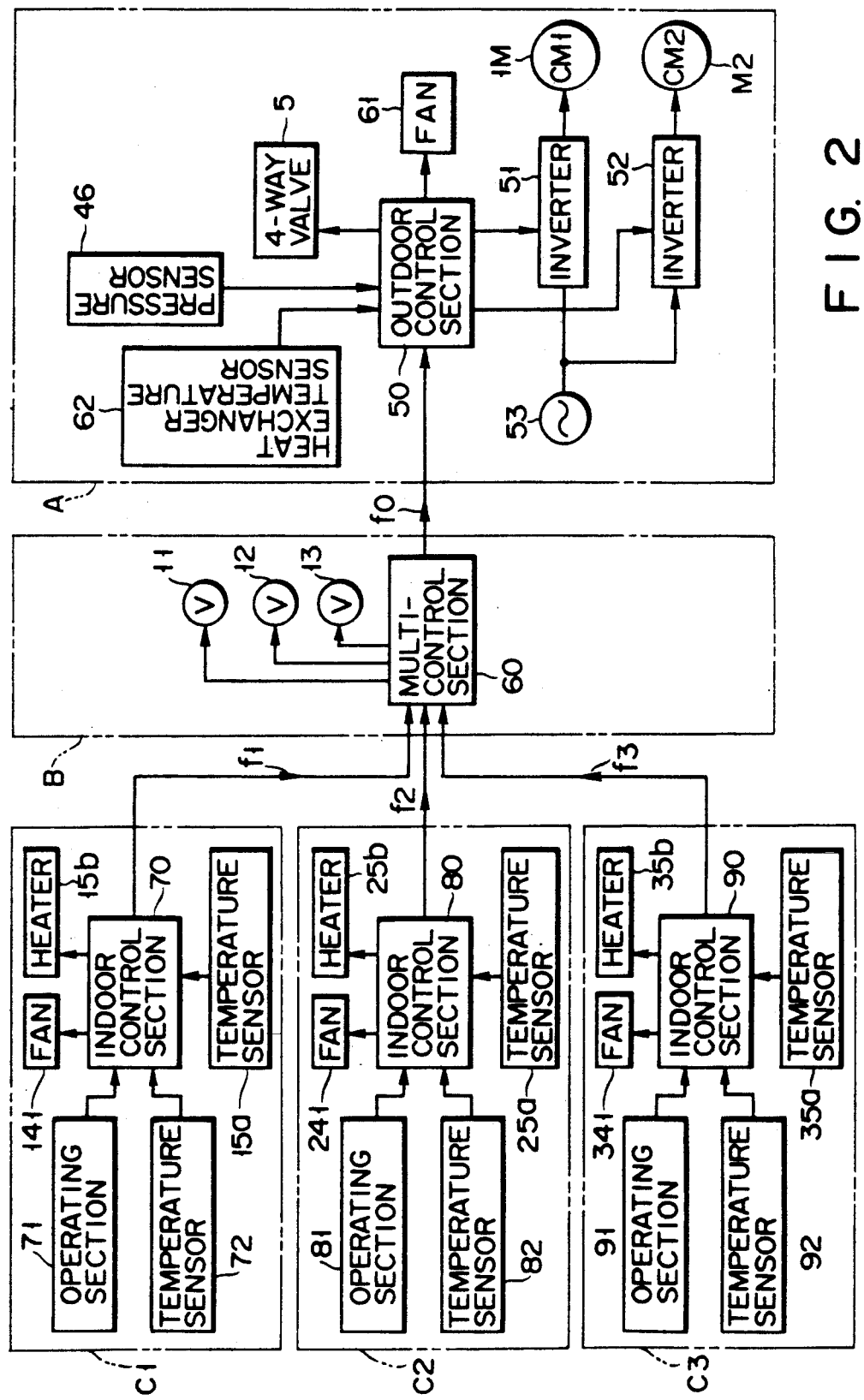
FIG. 2 is a block diagram showing a control circuit to which the first embodiment is applied.

FIG. 2 shows a control circuit arranged in the refrigeration cycle system in FIG. 1.

The outdoor unit A includes an outdoor control section 50. The outdoor control section 50 is constituted by a microcomputer, its peripheral circuits, and the like, and is externally connected to the pressure sensor 46, inverters 51 and 52, the outdoor fan 61, the outdoor heat exchanger temperature sensor 62, and the 4-way valve 5.

The inverters 51 and 52 rectify a voltage from an AC power source 53. Each inverter then converts the voltage into an AC voltage having a predetermined frequency upon switching operation corresponding to a command from the outdoor control section 50, and applies it, as a driving power, to a corresponding one of compressor motors 1M and 2M.

The branch unit B includes a multi-control section 60. The multi-control section 60 is constituted by a microcomputer, its peripheral circuits, and the like, and is externally connected to the flow control valves 11, 21, and 31.

The indoor units C1, C2, and C3 respectively include indoor control sections 70, 80, and 90. These indoor control sections are respectively constituted by microcomputers and their peripheral circuits, and are externally connected to operating sections 71, 81, and 91 for setting operation modes or setting desired temperatures, indoor temperature sensors 72, 82, and 92, the indoor heat exchanger temperature sensors 15a, 25a, and 35a, the defrosting heaters 15b, 25b, and 35b, and the indoor fans 141, 241, and 341.

The outdoor control section 50, the multi-control section 60, and the indoor control sections 70, 80, and 90 respectively constitute first to third control sections. The first control section controls the number of the compressors 1 and 2 to be driven and their operating frequencies in accordance with the required capacities of the indoor units C1, C2, and C3. The second control section sets the operating frequencies of the compressors 1 and 2 to be higher than a value corresponding to the required capacities of the indoor units C1, C2, and C3 when a heating operation is started or a heating operation is resumed after a defrosting operation. The third control section cancels the setting control of the second control section when the temperatures of the indoor heat exchangers of the indoor units C1, C2, and C3 reach a preset value or a lapse of a predetermined period of time is detected by a timer.

An operation in the above-described arrangement will be described below.

Assume that cooling operations are currently performed in all the indoor units C1, C2, and C3.

In this case, the indoor control section 70 of the indoor unit C1 calculates a difference between a temperature detected by the indoor temperature sensor 72 and a preset temperature set by the operating section 71 to detect an air conditioning load, and transfers a frequency setting signal f1 corresponding to the temperature difference to the multi-control section 60 as a required cooling capacity.

Similarly, the indoor control sections 80 and 90 of the indoor units C2 and C3 transfer frequency setting signals f2 and f3 to the multi-control section 60 as required cooling capacities, respectively.

The multi-control section 60 obtains the required cooling capacities of the respective indoor units on the basis of the transferred frequency setting signals, and transfers a frequency setting signal f0 corresponding to the sum of the transferred signals to the outdoor control section 50.

The outdoor control section 50 controls the number of the compressors 1 and 2 to be driven and their operating frequencies (the output frequencies of the inverters 51 and 52) on the basis of the transferred frequency setting signal F0. At the same time, the section 50 performs correction control of the operating frequency in accordance with the detection value from the pressure sensor 46.

In this case, the outdoor control section 50 shifts a single-compressor operation using only the compressor 1 to a double-compressor operation using the compressors 1 and 2 with an increase in sum of the required cooling capacities.

In accordance with the required cooling capacities of the indoor units C1, C2, and C3, the multi-control section 60 controls the openings of the corresponding flow control valves 11, 21, and 31 so as to control flow rates of the refrigerant to the indoor heat exchangers 14, 24, and 34, thus maintaining the refrigerant superheat degree at a predetermined value.

When a heating operation is to be performed, the flow of the refrigerant is reversed, and substantially the same capacity control as described above is performed with respect to the compressors 1 and 2.

Figure 3:
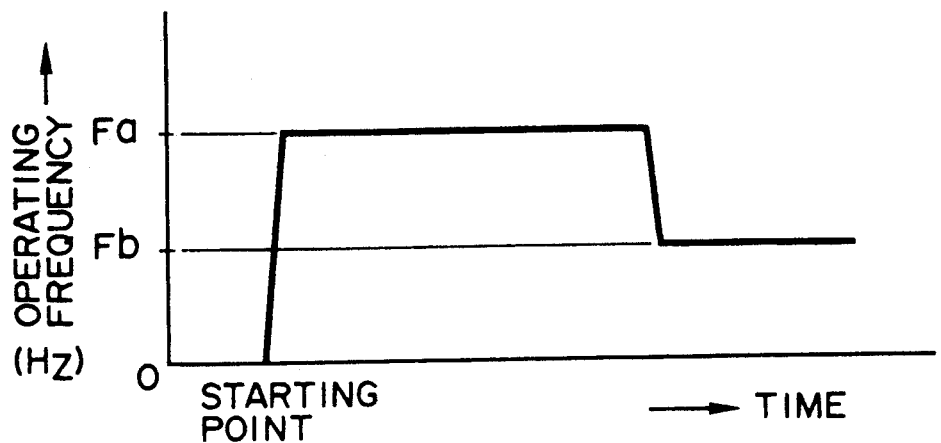
FIG. 3 is a graph for explaining changes in operating frequency in the first embodiment.

When the heating operation is started, the outdoor control section 50 periodically sends heat exchanger temperature detecting commands to the indoor control sections 70, 80, and 90 through the multi-control section 60, and monitors the detection temperatures of the indoor heat exchanger temperature sensors 15a, 25a, and 35a (i.e., the indoor heat exchangers 14, 24, and 34). The outdoor control section 50 keeps stopping the indoor fans 141, 241, and 341 and keeps the operating frequencies of the compressors 1 and 2 to be a value Fa higher than a normal value Fb corresponding to the required heating capacities of the indoor units C1, C2, and C3 (e.g., Fa=2Fb) until the detection temperatures of the indoor heat exchanger temperature sensors 15a, 25a, and 35a reach a preset value corresponding to the operation canceling point of a cool air preventing function, as shown in FIG. 3.

Such an operating frequency increasing operation is performed in the same manner as described above when a heating operation is to be resumed after a defrosting operation (this operation will be described later).

It is apparent that required heating capacities and the detection temperatures of the indoor heat exchanger temperature sensors 15a, 25a, and 35a are fetched in correspondence with only indoor units to be driven.

By increasing heating capacities in this manner, warm air can be blown into rooms, even cold rooms, within a short period of time regardless of the length of piping and the number of indoor units to be driven. This greatly improves the hot starting characteristics (e.g., in a case of a piping length of about 100 meters, a hot starting time of 17 minutes in the conventional system can be reduced to about 2 to 3 minutes).

Figure 4:
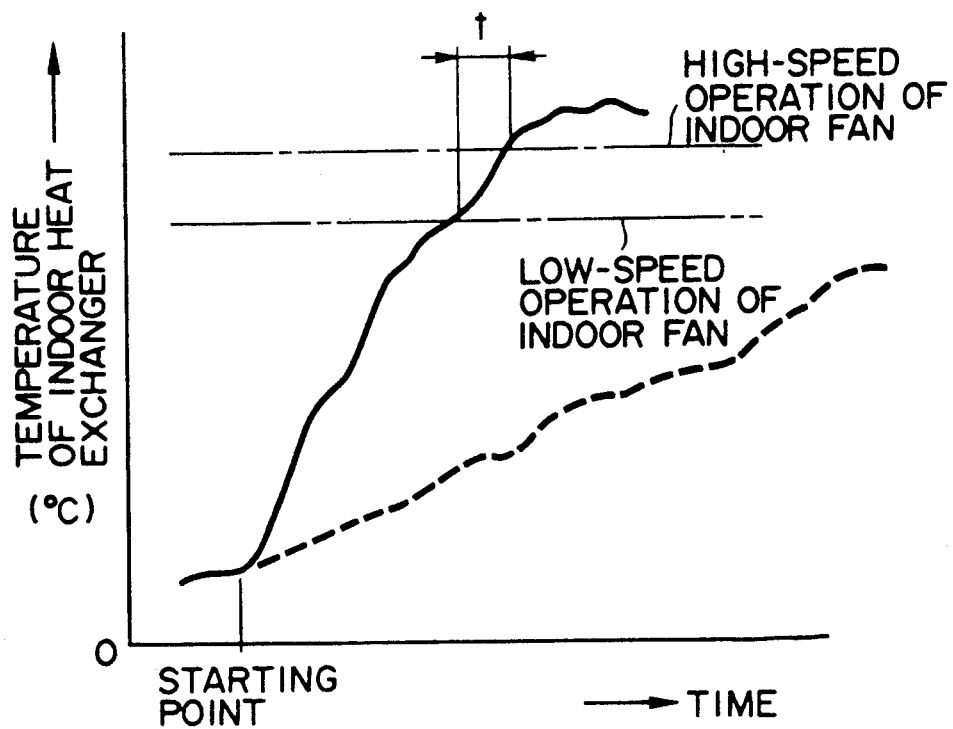
FIG. 4 is a graph showing changes in temperature of an indoor heat exchanger in the first embodiment in comparison with a conventional system.

FIG. 4 shows actually measured temperature changes of the indoor heat exchangers 14, 24, and 34 in comparison with those of the conventional system. As shown in FIG. 4, hot starting was quickly performed from a starting point, and a time interval t between low-speed operation and high-speed operation of the indoor fans 141, 241, and 341 was shortened.

Subsequently, the outdoor control section 50 performs a control operation for performing a normal heating operation by resetting the operating frequencies of the compressors 1 and 2 to the normal value Fb corresponding to the required heating capacities of the indoor units C1, C2, and C3, and also performs the following defrosting operation as needed.

The outdoor control section 50 periodically fetches the detection temperature of the outdoor heat exchanger temperature sensor 62 (the temperature of the outdoor heat exchanger 6). If the detection temperature becomes a reference value or less, the section 50 re-energizes the 4-way valve 5 and stops the outdoor fan 61. At the same time, the section 50 controls the indoor control sections 70, 80, and 90 through the multi-control section 60 to respectively apply voltages to the heaters 15b, 25b, and 35b. When the 4-way valve 5 is re-energized, a defrosting (cooling) cycle is formed, and a high-temperature refrigerant, which is heated by the heaters 15b, 25b, and 35b, flows into the outdoor heat exchanger 6. That is, such a defrosting operation for the outdoor heat exchanger 6 is periodically performed as needed in order to prevent degradation of the heating performance, which is caused when the surface of the outdoor heat exchanger 6, serving as an evaporator, is frosted in the process of a heating operation. Since the outdoor fan 61 is stopped during this defrosting operation, the defrosting efficiency is increased. In addition, air which is drawn from an air suction port 11 upon operation of the indoor fans 141, 241, and 341 is heated by the heaters 15b, 25b, and 35b and is blown into each room. That is, a heating operation is continued during a defrosting operation.

Indoor temperatures, however, may be considerably decreased due to a defrosting operation. For this reason, when a heating operation is to be started upon a defrosting operation, the operating frequencies of the compressors 1 and 2 are increased in the above-described manner.

Figure 5:
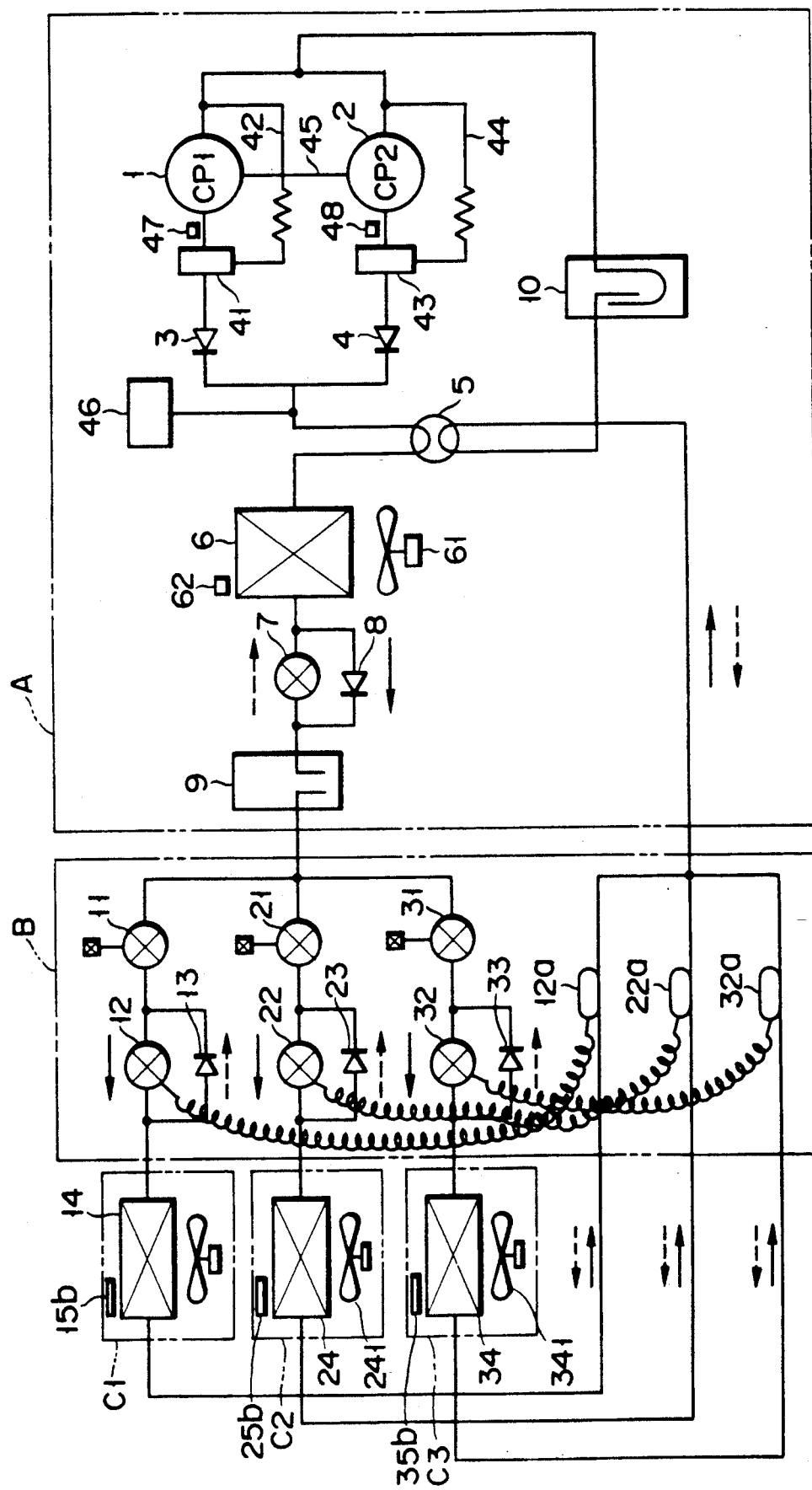
FIG. 5 is a view showing an arrangement of a refrigeration cycle system to which the second embodiment of the present invention is applied.
Figure 6:
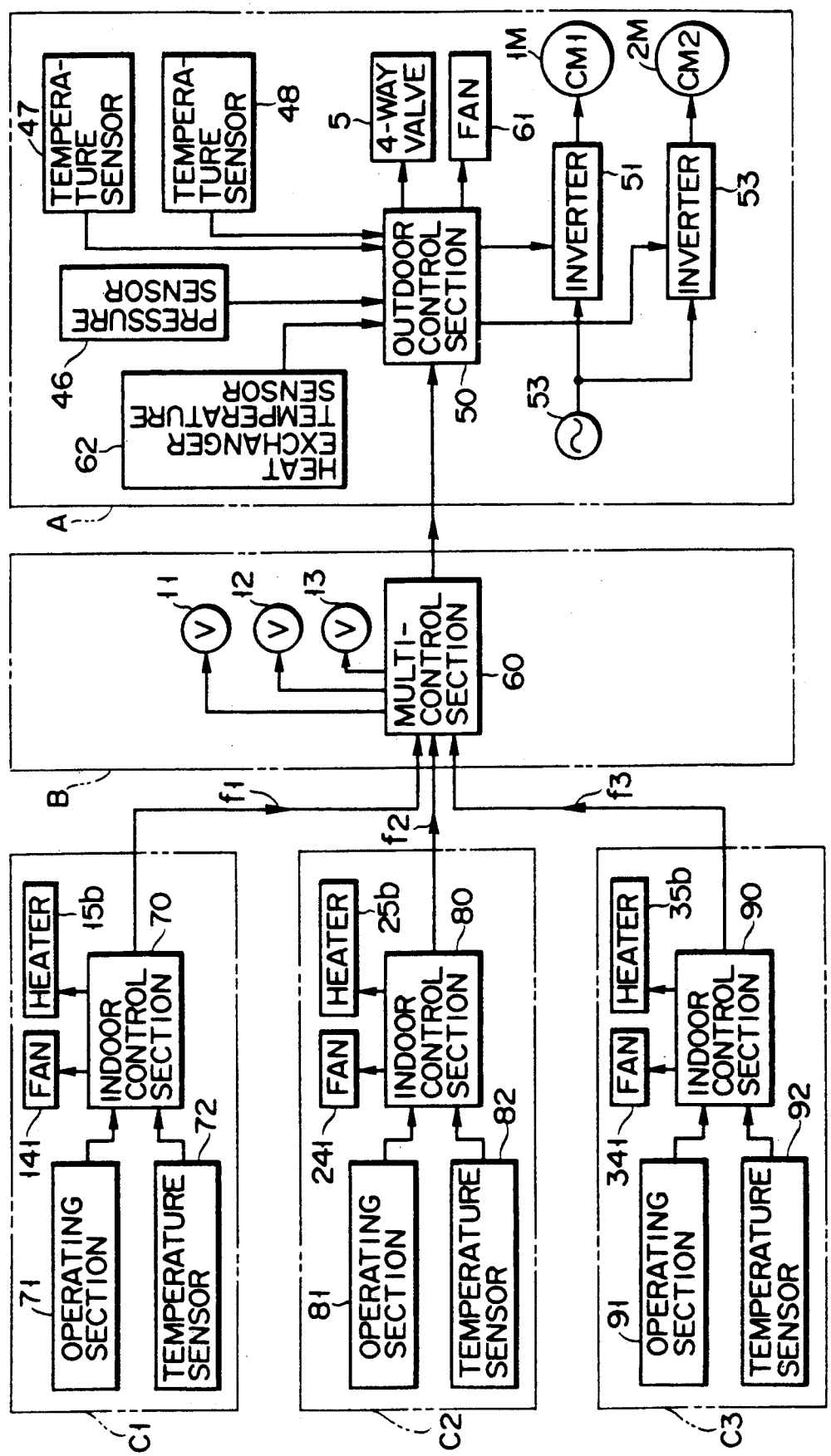
FIG. 6 is a block diagram showing a control circuit to which the second embodiment is applied.

FIGS. 5 and 6 show the second embodiment of the present invention. The same reference numerals in FIGS. 5 and 6 denote the same parts as in FIG. 1 and 2, and a detailed description thereof will be omitted.

In this embodiment, refrigerant temperature sensors 47 and 48 for detecting discharged refrigerant temperatures are arranged in place of the heat exchanger temperature sensors 15a, 25a, and 35a for detecting the temperatures of the indoor heat exchangers.

An outdoor control section 50, a multi-control section 60, and indoor control sections 70, 80, and 90 constitute first to third control sections. The first control section controls the number of compressors 1 and 2 to be driven and their operating frequencies in accordance with the required capacities of indoor units C1, C2, and C3. The second control section sets the operating frequencies of the compressors 1 and 2 to be higher than a value corresponding to the required capacities of the indoor units C1, C2, and C3 when a heating operation is to be started or a heating operation is to be resumed upon a defrosting operation. The third control section cancels the setting control of the second control section when the discharged refrigerant temperatures of the compressors 1 and 2 reach a preset value or a lapse of a predetermined period of time is detected by a timer.

An operation of the second embodiment will be described below.

When a heating operation is to be started or a heating operation is to be resumed upon a defrosting operation, the outdoor control section 50 sets the operating frequencies of the compressors 1 and 2 to be a value Fa higher than a normal value Fb corresponding to the required heating capacities of the indoor units C1, C2, and C3 (see FIG. 3).

Figure 7:
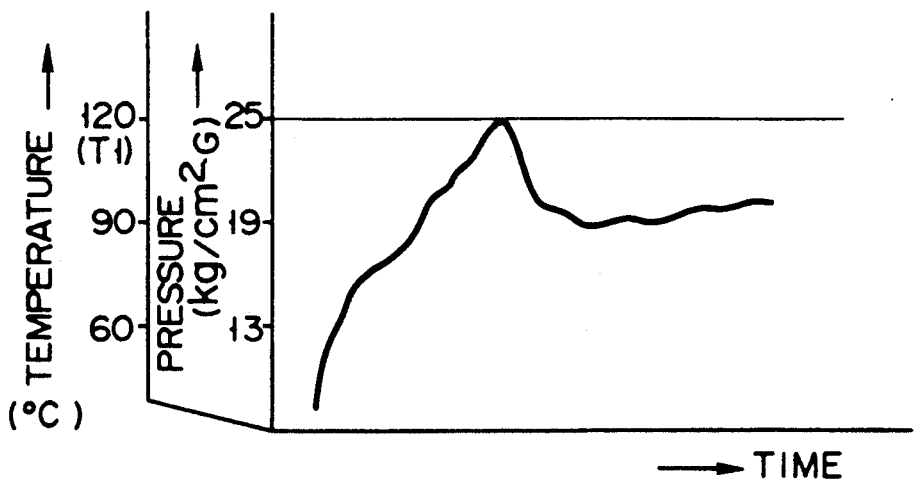
FIG. 7 is a graph showing changes in temperature and pressure of the discharged refrigerant in the second embodiment

If, however, either detection temperatures of the refrigerant temperature sensors 47 and 48 (discharged refrigerant temperatures) or the detection pressure of a pressure sensor 46 (discharged refrigerant pressure) reach a preset value, or a lapse of a predetermined period of time is detected by the timer, the outdoor control section 50 cancels the setting of the increased operating frequencies, as shown in FIG. 7.

By increasing heating capacities in this manner during a hot starting period, warm air can be blown into an overload condition, and adverse influences on the refrigeration cycle system can be avoided.

Figure 8:
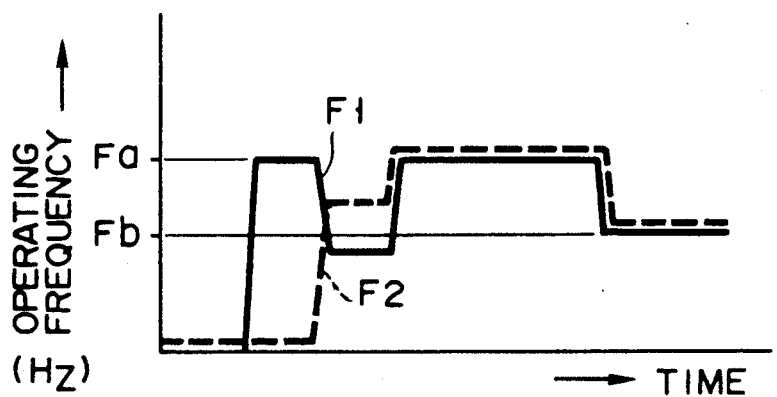
FIG. 8 is a graph for explaining changes in operating frequency in the first and second embodiments.
Figure 9:
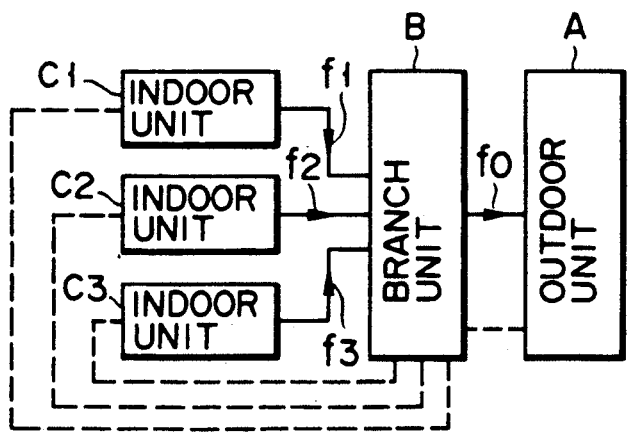
FIG. 9 is a view showing a schematic arrangement of a conventional air-conditioning system.

In each embodiment, when a heating or cooling operation is to be started, operating frequencies F1 and F2 of the compressors 1 and 2 may be set to be different in level from each other so that an oil equalizing operation between the compressors 1 and 2 is performed first, and capacity increasing control is subsequently performed, as shown in FIG. 8.

In each embodiment, the system includes two compressors. However, the present invention is not limited to this, but the system may include one compressor or three or more compressors.

The present invention is not limited to the above-described embodiments. Various changes and modifications can be made within the spirit and scope of the invention.

As has been described above, since the multi-type air-conditioning system of the present invention comprises the control section for setting the operating frequencies of the compressors to be higher than a value corresponding to the required capacities of the indoor units when a heating operation is to be started or a heating operation is to be resumed upon a defrosting operation, warm air can be blown into the rooms within a short period of time when a heating operation is started or a heating operation is resumed upon a defrosting compressor or three or more compressors.

The present invention is not limited to the above-described embodiments. Various changes and modifications can be made within the spirit and scope of the invention.

As has been described above, since the multi-type air-conditioning system of the present invention comprises the control section for setting the operating frequencies of the compressors to be higher than a value corresponding to the required capacities of the indoor units when a heating operation is to be started or a heating operation is to be resumed upon a defrosting operation, warm air can be blown into the rooms within a short period of time when a heating operation is started or a heating operation is resumed upon a defrosting operation, thus greatly improving the hot starting characteristics.

In addition, since the multi-type air-conditioning system of the present invention comprises the control section for setting the operating frequencies of the compressors to be higher than a value corresponding to the required capacities of the indoor units when a heating operation is to be started or a heating operation is to be resumed upon a defrosting operation, and the control section for canceling the setting control of the above control section when the temperatures of the indoor heat exchangers of the indoor units reach a preset value, warm air can be blown into the rooms within a short period of time when a heating operation is started or a heating operation is resumed upon a defrosting operation, thus greatly improving the hot starting characteristics.

Moreover, since the multi-type air-conditioning system of the present invention comprises the control section for setting the operating frequencies of the compressors to be higher than a value corresponding to the required capacities of the indoor units when a heating operation is to be started or a heating operation is to be resumed upon a defrosting operation, and the control section for canceling the setting control of the above control section when the discharged refrigerant temperatures or pressures of the compressors reach a preset value, or a predetermined period of time elapses, warm air can be blown into the rooms within a short period of time when a heating operation is started or a heating operation is resumed upon a defrosting operation, thus greatly improving the hot starting characteristics and allowing a stable operation under an overload condition.

What is claimed is:

1. A multi-type air-conditioning system comprising:
   an outdoor unit comprising
      a variable-capacity compressor and
      an outdoor heat exchanger coupled to said variable-capacity compressor;
   a plurality of indoor units each indoor unit comprising
      an indoor heat exchanger and
      means for outputting required capacity data in accordance with an air-conditioning load, for at least a heating operation, of said indoor heat exchanger;
   a distribution unit for parallel-coupling said plurality of indoor units to said outdoor unit during a plurality of refrigeration cycles for at least heating operations, the distribution unit including a plurality of refrigerant flow rate control means for controlling flow rate of refrigerant through the distribution unit during the refrigeration cycles;
   first control means for
      supplying flow rate control commands to said refrigerant flow rate control means of said distribution unit in accordance with said required capacity data from said plurality of indoor units, and for
controlling an operating frequency to change a capacity of said variable-capacity compressor in accordance with sum data of said required capacity data;
second control means for performing a frequency increasing control to increase said operating frequency of said variable-capacity compressor to a predetermined value higher than a value corresponding to said required capacity data when said heating operation starts; and
third control means for canceling said frequency increasing control of said second control means when a predetermined interval of time elapses after said second control means causes said refrigeration cycles to start heating operations, said third control means including
means for periodically fetching heat exchanger temperature data of said indoor heat exchanger, means for comparing said heat exchanger temperature data with a reference value, and
means for providing a cancel command to said second control means when an output representing that said heat exchanger temperature data has reached said reference value is obtained from said comparing means.

2. A multi-type air-conditioning system comprising:
an outdoor unit including at least a variable-capacity compressor and an outdoor heat exchanger coupled thereto;
a plurality of indoor units each including at least an indoor heat exchanger and means for outputting required capacity data in accordance with an air-conditioning load, for at least a heating operation, of said indoor heat exchanger;
a distribution unit for parallel-coupling said plurality of indoor units to said outdoor unit so as to constitute a plurality of refrigeration cycles for cooling and heating operations, said distribution unit including a plurality of refrigerant flow rate control means for the respective refrigeration cycles;
first control means for supplying flow rate control commands to said refrigerant flow rate control means of said distribution unit, respectively, in accordance with the required capacity data from said plurality of indoor units, and for controlling an operating frequency to change a capacity of said variable-capacity compressor in accordance with sum data of the required capacity data;
second control means for performing a frequency increasing control to increase the operating frequency of said variable-capacity compressor to a predetermined value higher than a value corresponding to the required capacity data when the heating operation is started;
third control means for canceling the frequency increasing control of said second control means at a predetermined period of time elapse after said second control means causes the refrigeration cycles to start heating operations;
fourth control means including means for periodically fetching heat exchanger temperature data of said outdoor heat exchanger, means for comparing the heat exchanger temperature data with a reference value while said third control means causes a corresponding one of the refrigeration cycles to perform a heating operation by said first control means, and means for providing a command for switching a corresponding one of the refrigeration cycles to a cooling operation for a predetermined period of time so as to defrost said outdoor heat exchanger when said comparing means determines that the heat exchanger temperature data becomes not more than the reference value; and
fifth control means including means for providing a command for resetting the corresponding one of the refrigeration cycles to the heating operation when a defrosting operation by said fourth control means is completed, and means for providing a command for causing said second control means to perform the frequency increasing control when the heating operation is resumed in response to the resetting command after the defrosting operation of each of the refrigeration cycles is completed.

3. A system according to claim 2, wherein said third control means includes means for periodically fetching heat exchanger temperature data of said indoor heat exchanger, means for comparing the heat exchanger temperature data with a reference value, and means for providing a cancel command to said second control means when an output representing that the heat exchanger temperature data reaches the reference value is obtained from said comparing means.

4. A system according to claim 2, wherein said third control means includes means for periodically fetching discharged refrigerant temperature data of said variable-capacity compressor, means for comparing the discharged refrigerant temperature data with a reference value, and means for providing a cancel command to said second control means when an output representing that the discharged refrigerant temperature data reaches the reference value is obtained from said comparing means.

5. A system according to claim 2, wherein said third control means includes means for periodically fetching discharged refrigerant pressure data of said variable-capacity compressor, means for comparing the discharged refrigerant pressure data with a reference value, and means for providing a cancel command to said second control means when an output representing that the discharged refrigerant pressure data reaches the reference value is obtained from said comparing means.

6. A system according to claim 2, wherein said third control means includes means for providing a cancel command to said second control means upon a timer operation.

7. A system according to claim 2, wherein each of said indoor units includes an indoor fan, and fan control means for keep stopping said indoor fan while frequency increasing control is performed by said second control means, and starting said indoor fan after the frequency increasing control is canceled by said third control means.

8. A system according to claim 7, wherein said fan control means includes means for periodically fetching heat exchanger temperature data of said indoor heat exchanger, means for comparing the heat exchanger temperature data with first and second reference values, and means for providing a command for operating said indoor fan at a low speed when an output representing that the heat exchanger temperature data reaches the first reference value is obtained from said comparing means, and for providing a command for operating said indoor fan at a high speed when an output representing that the heat exchange temperature data reaches the second reference value is obtained from said comparing means.

9. A multi-type air-conditioning system comprising:
an outdoor unit comprising
a variable-capacity compressor and
an outdoor heat exchanger coupled to said variable-capacity compressor;
a plurality of indoor units each indoor unit comprising
an indoor heat exchanger and
means for outputting required capacity data in accordance with an air-conditioning load, for at least a heating operation, of said indoor heat exchanger;
a distribution unit for parallel-coupling said plurality of indoor units to said outdoor unit during a plurality of refrigeration cycles for at least heating operations, the distribution unit including a plurality of refrigerant flow rate control means for controlling flow rate of refrigerant through the distribution unit during the refrigeration cycles;
first control means for
supplying flow rate control commands to said refrigerant flow rate control means for said distribution unit in accordance with said required capacity data from said plurality of indoor units, and for
controlling an operating frequency to change a capacity of said variable-capacity compressor in accordance with sum data of said required capacity data;
second control means for performing a frequency increasing control to increase said operating frequency of said variable-capacity compressor to a predetermined value higher than a value corresponding to said required capacity data when said heating operation starts; and
third control means for canceling said frequency increasing control of said second control means when a predetermined interval of time elapses after said second control means causes said refrigeration cycles to start heating operations, said third control means including
means for periodically fetching discharged refrigerant temperature data of said variable-capacity compressor,
means for comparing said discharged refrigerant temperature data with a reference value, and
means for providing a cancel command to said second control means when an output representing that said discharged refrigerant temperature data has reached said reference value is obtained from said comparing means.

10. A multi-type air-conditioning system comprising:
an outdoor unit comprising
a variable-capacity compressor and
an outdoor heat exchanger coupled to said variable-capacity compressor;
a plurality of indoor units each indoor unit comprising
an indoor heat exchanger and
means for outputting required capacity data in accordance with an air-conditioning load, for at least a heating operation, of said indoor heat exchanger;
a distribution unit for parallel-coupling said plurality of indoor units to said outdoor unit during a plurality of refrigeration cycles for at least heating operations, the distribution unit including a plurality of refrigerant flow rate control means for controlling flow rate of refrigerant through the distribution unit during the refrigeration cycles;
first control means for
supplying flow rate control commands to said refrigerant flow rate control means for said distribution unit in accordance with said required capacity data from said plurality of indoor units, and for
controlling an operating frequency to change a capacity of said variable-capacity compressor in accordance with sum data of said required capacity data;
second control means for performing a frequency increasing control to increase said operating frequency of said variable-capacity compressor to a predetermined value higher than a value corresponding to said required capacity data when said heating operation starts; and
third control means for canceling said frequency increasing control of said second control means when a predetermined interval of time elapses after said second control means causes said refrigeration cycles to start heating operations, said third control means including
means for periodically fetching discharged refrigerant pressure data of said variable-capacity compressor,
means for comparing said discharged refrigerant pressure data with a reference value, and
means for providing a cancel command to said second control means when an output representing that said discharged refrigerant pressure data has reached said reference value is obtained from said comparing means.

11. A multi-type air-conditioning system comprising:
an outdoor unit comprising
a variable-capacity compressor and
an outdoor heat exchanger coupled to said variable-capacity compressor;
a plurality of indoor units each indoor unit comprising
an indoor heat exchanger including
an indoor fan and
fan control means for stopping said indoor fan and
means for outputting required capacity data in accordance with an air-conditioning load, for at least a heating operation, of said indoor heat exchanger;
a distribution unit for parallel-coupling said plurality of indoor units to said outdoor unit during a plurality of refrigeration cycles for at least heating operations, the distribution unit including a plurality of refrigerant flow rate control means for controlling flow rate of refrigerant through the distribution unit during the refrigeration cycles;
first control means for
supplying flow rate control commands to said refrigerant flow rate control means for said distribution unit in accordance with said required capacity data from said plurality of indoor units, and for
controlling an operating frequency to change a capacity of said variable-capacity compressor in accordance with sum data of said required capacity data;

second control means for performing a frequency increasing control to increase said operating frequency of said variable-capacity compressor to a predetermined value higher than a value corresponding to said required capacity data when said heating operation starts; and third control means for canceling said frequency increasing control of said second control means when a predetermined interval of time elapses after said second control means causes said refrigeration cycles to start heating operations, wherein said fan control means stops said indoor fan while said second control means performs said frequency increasing control, and wherein said fan control means starts said indoor fan after said third control means cancels said frequency increasing control.

12. A system according to claim 11, wherein said fan control means includes means for periodically fetching heat exchanger temperature data of said indoor heat exchanger, means for comparing said heat exchanger temperature data with a first and a second reference values, and means for providing commands for operating said indoor fan at a low speed when an output representing that said heat exchanger temperature data has reached said first reference value is obtained from said comparing means and for operating said indoor fan at a high speed when an output representing that said heat exchange temperature data has reached said second reference value is obtained from said comparing means.

* * * * *